(12) United States Patent
DuBose et al.

(10) Patent No.: US 7,290,631 B2
(45) Date of Patent: Nov. 6, 2007

(54) WRAPPED-CONE FINGERS FOR SKIRT SYSTEMS

(75) Inventors: W. Keith DuBose, Pensacola, FL (US); Kirk A. Magnusen, Slidell, LA (US)

(73) Assignee: Textron Inc., Wilmington, MA (US)

( * ) Notice: Subject to any disclaimer, the term of this patent is extended or adjusted under 35 U.S.C. 154(b) by 269 days.

(21) Appl. No.: 10/832,198

(22) Filed: Apr. 26, 2004

(65) Prior Publication Data

US 2005/0236200 A1 Oct. 27, 2005

(51) Int. Cl.
*B60V 1/04* (2006.01)

(52) U.S. Cl. .................. 180/121; 180/127; 180/128

(58) Field of Classification Search ........... 180/121, 180/127, 126
See application file for complete search history.

(56) References Cited

U.S. PATENT DOCUMENTS

| | | | |
|---|---|---|---|
| 3,783,965 A | | 1/1974 | Wright |
| 3,921,753 A | * | 11/1975 | Pont ................ 180/127 |
| 3,964,698 A | | 6/1976 | Earl |
| 4,646,866 A | * | 3/1987 | Bertrand et al. ........ 180/126 |
| 4,834,011 A | * | 5/1989 | Bell ................ 114/67 A |
| 4,924,958 A | | 5/1990 | Yoshida et al. |
| 5,119,897 A | * | 6/1992 | Moriwake ............ 180/127 |
| 5,542,366 A | * | 8/1996 | Bell ................ 114/67 A |
| 5,560,443 A | * | 10/1996 | DuBose .............. 180/121 |
| 5,931,248 A | * | 8/1999 | Vickers et al. ........ 180/116 |
| 5,941,331 A | * | 8/1999 | Gastesi ............... 180/120 |

FOREIGN PATENT DOCUMENTS

| | | |
|---|---|---|
| GB | 1179121 | 1/1970 |
| GB | 1208924 | 10/1970 |
| GB | 2203109 | 10/1988 |
| JP | 10044979 | 2/1998 |

* cited by examiner

*Primary Examiner*—Lesley D. Morris
*Assistant Examiner*—Marlon Arce-Diaz
(74) *Attorney, Agent, or Firm*—Garvey, Smith, Nehrbass & North, L.L.C.; Charles C. Garvey, Jr.; Seth M. Nehrbass (57) ABSTRACT

Wrapped-cone fingers for use in an air-cushion vehicle (ACV) skirt system are described. Wrapped-cone fingers may include an inner cone that is "wrapped" or generally enclosed by an outer finger. The inner cone may include an inner cone opening through which air may travel. The outer cone may include a back face opening. When inflated, the inner cone blocks the back face opening in the outer finger, allowing for increased air pressure in the outer finger and thus inflating the inner cone and outer finger of the wrapped-cone finger. Wrapped-cone fingers according to the present invention may be lightweight, inexpensive and resistant to scooping and snagging. Embodiments are also directed to ACV skirt systems and methods of manufacturing wrapped-cone fingers for use with an ACV skirt system.

50 Claims, 11 Drawing Sheets

WRAPPED-CONE FINGERS FOR SKIRT SYSTEMS

BACKGROUND

Hovercraft or air-cushion vehicles (ACVs) are commonly used to transport passengers and cargo over variable terrain including water, snow, and land. ACVs typically use a skirt system to contain a volume of air, or "air cushion," which supports the weight of the vehicle during operation. An ACV skirt system commonly includes a skirt bag and multiple smaller cells or "fingers" that are adjacent to one another and located around the lower periphery of the skirt bag. The skirt bag forms a boundary or curtain around the perimeter of the ACV hull to contain the air cushion. The fingers help to form an air cushion seal between the skirt bag and the underlying terrain, e.g., land or water.

Figure 1:
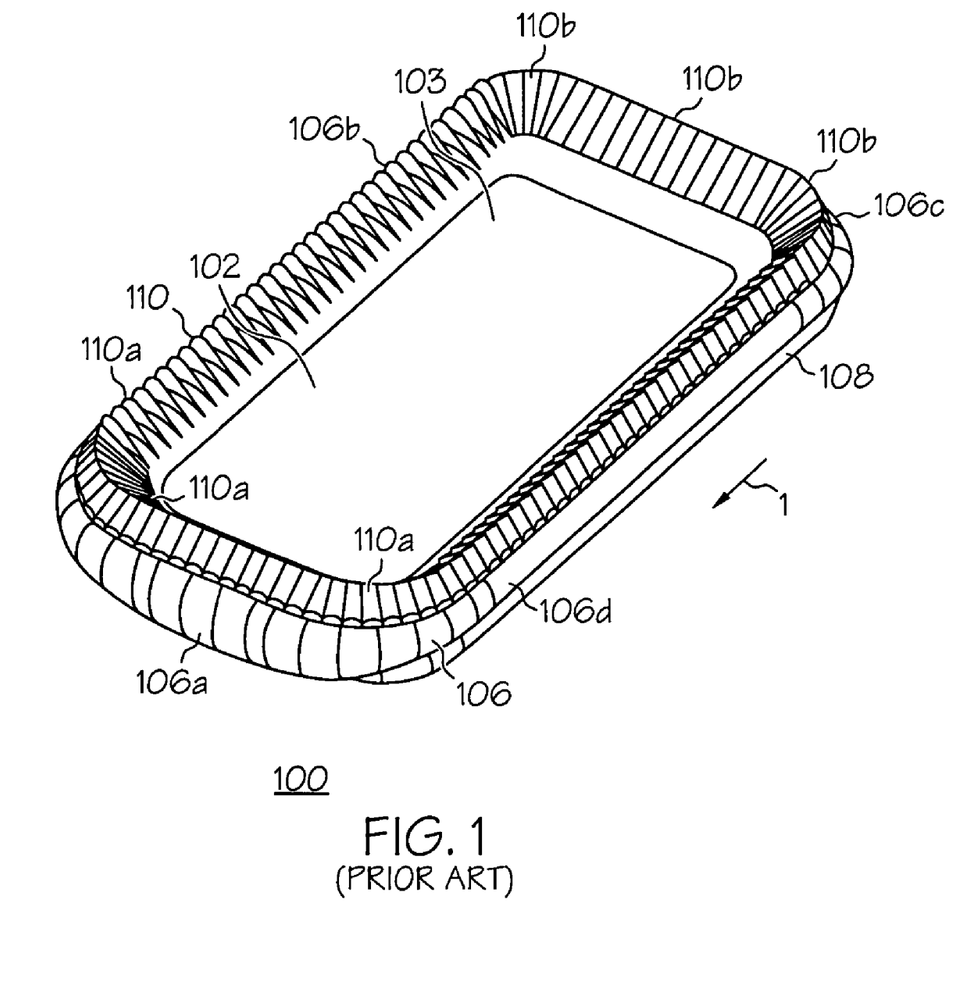
FIG. 1 shows a perspective view of the underside of a representative hovercraft with prior art air-cushion vehicle (ACV) skirt system.

FIG. 1 shows a perspective view of the underside of a representative hovercraft or ACV including a prior art skirt system 100 with direction of forward travel 1 toward the ACV bow indicated. The prior art skirt system 100 includes a peripheral bag or skirt bag 106 and fingers 110. The skirt bag 106 is attached to the periphery of the underside of an ACV hull 102. The hull 102 may be attached to a deck 108 as shown. The skirt bag 106 may include bow 106a, port 106b, stem 106c, and starboard 106d sections.

The design of a finger 110 may vary, depending on the location of a particular finger on the perimeter of the skirt bag 106. Different finger designs may help to maintain the air cushion as the ACV moves in various directions and over different types of surfaces and terrain. For example, an open-cone or open-finger design is commonly used for fingers 110a located at the bow section 106a and side sections 106b, 106d of the skirt bag 106. An open finger 110a may include an open loop or cone of flexible material that is attached to the peripheral bag 106 along a perimeter. For further example, a closed-cone or closed-finger design is commonly used for fingers located at the stem and stem corner locations of a skirt system, e.g., skirt system 100. Closed fingers 110b may include a closed loop or cone of flexible material, forming a substantially closed air cell or compartment.

The skirt bag 106 is typically inflated through ports or feed ducts that are supplied with air by one or more fans located on the deck 108. The fingers 110 are typically inflated with air from the skirt bag and/or air from the air cushion. Feed holes in the skirt bag may supply air to closed fingers. Open fingers are open to and receive a supply of air from the air cushion. Open fingers may also have local feed holes supplying air from the skirt bag to facilitate inflation.

Figure 2:
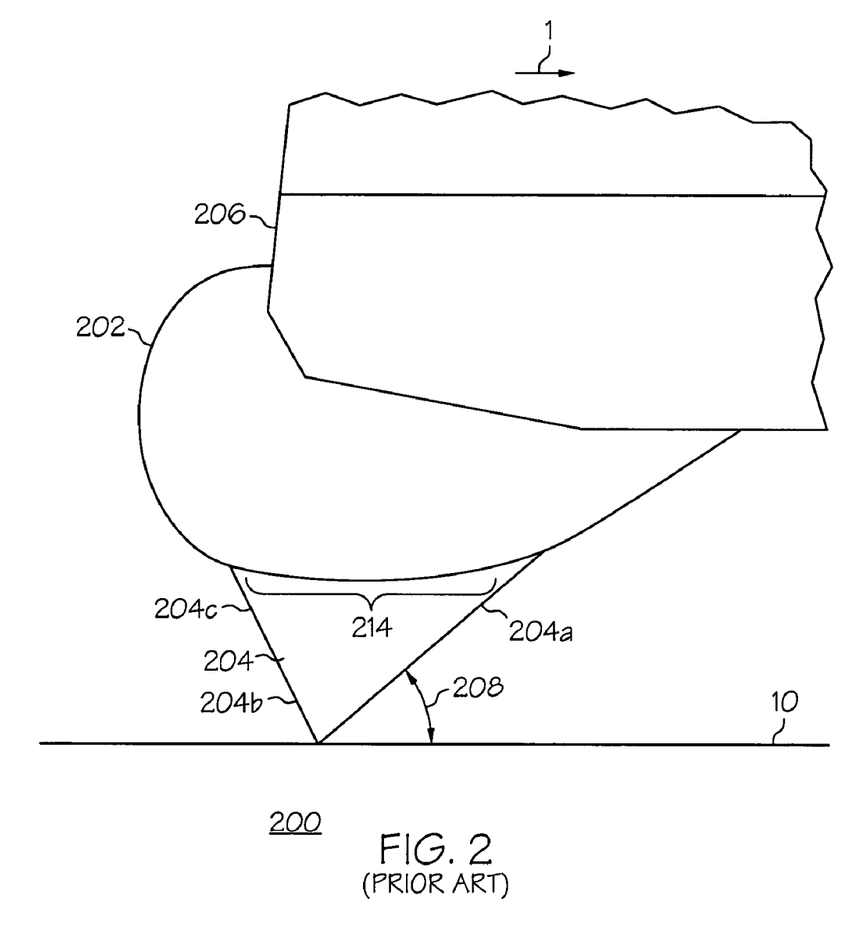
FIG. 2 shows a profile of a prior art skirt system.

FIG. 2 shows a profile of a prior art skirt system 200 including a skirt bag 202 connected to a portion of an ACV hull 206. A finger 204 is attached to the skirt bag 202. The direction of the bow of the ACV is indicated 1. The finger 204 is shown as a conventional closed finger design and would normally be located at the stem or stem corners of a skirt bag. The finger 204 may include a leading face or edge 204a and a swept-back finger or cone portion 204b that is formed by the looped edge of the finger or cone material. The leading edge 204a may face in a desired direction relative to the skirt and ACV hull, depending on the type of finger and its location on the skirt bag 202, e.g., toward the bow 1 or towards the port and starboard directions. The leading edge 204a may form a leading edge angle 208 with the underlying terrain or sea surface 10 as shown. The finger 204 design shown may sometimes be referred to as a "swept-back cone" design, in reference to the finger resembling a cone of fabric or flexible material that has been cut in half.

With continued reference to FIG. 2, the stem finger 204 is attached to the skirt bag 202 at an attachment perimeter 214 (only one portion of the attachment perimeter is shown). One of skill in the art will understand that the attachment perimeter 214 will typically have an open-ended shape for an open finger design, e.g., in the shape of the letter "U" or an open oval shape. For a closed finger design, an aft panel forming a back face 204c would normally be included to seal the swept-back cone portion 204b.

Figure 3:
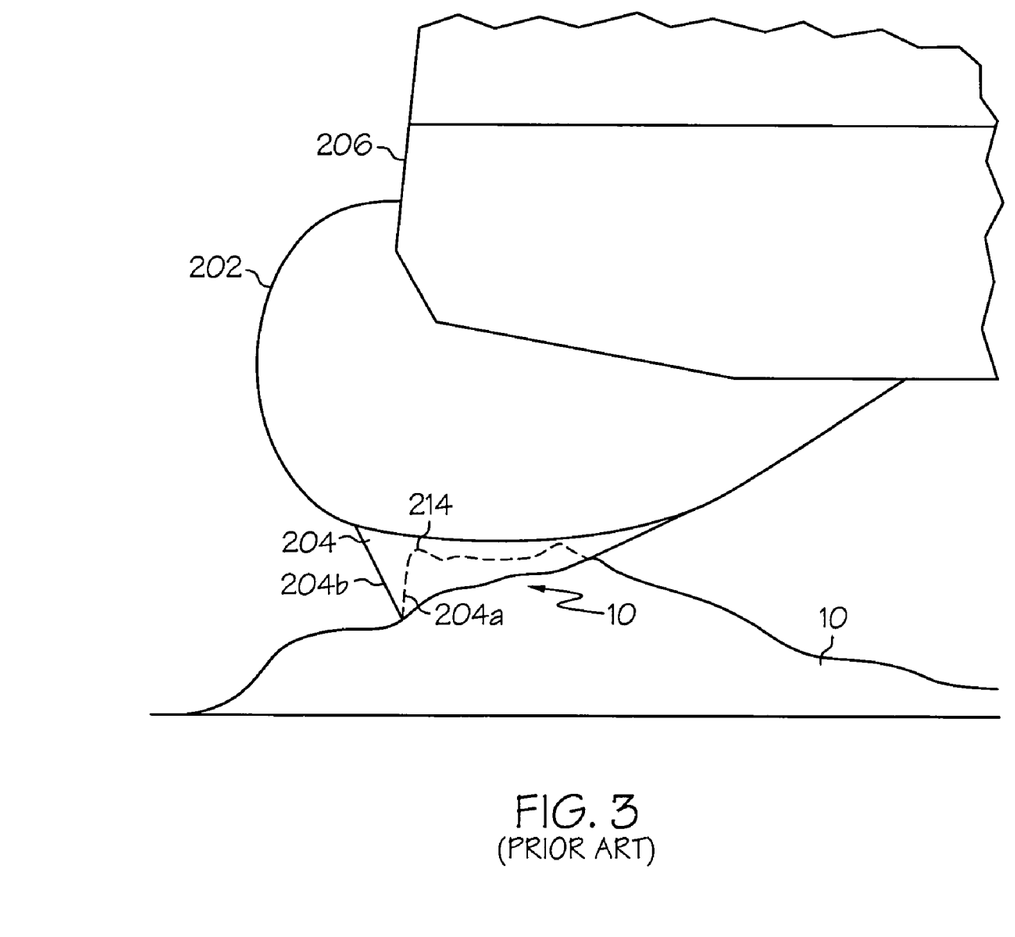
FIG. 3 shows a profile of the skirt system of FIG. 2 with a conventional, prior art finger that is in a collapsed position

FIG. 3 shows a profile of the prior art skirt system 200 of FIG. 2 with a conventional closed finger 204 that is in a collapsed position. Closed fingers 204 may collapse in certain situations, such as when a water wave 10 impacts the leading edge 204a of the finger 204. When the pressure and forces on the leading edge 204a exceed the counter pressure and force of the air inside the finger 204, the leading edge 204a can become turned inside out thereby creating a scoop 214, e.g., a concave surface with an included angle, as shown.

The creation of a scoop 214 is sometimes referred to as "scooping". When scooping occurs in one or more close fingers, large water-generated forces or water loads can result in a degradation in ACV performance and ultimately either a material or attachment structural failure to a finger and/or adjacent skirt structure. These types of failures are sometimes referred to as finger "blow-out". Accordingly, FIG. 3 illustrates one problem associated with prior art stern fingers, e.g., finger 200.

Figure 4A:
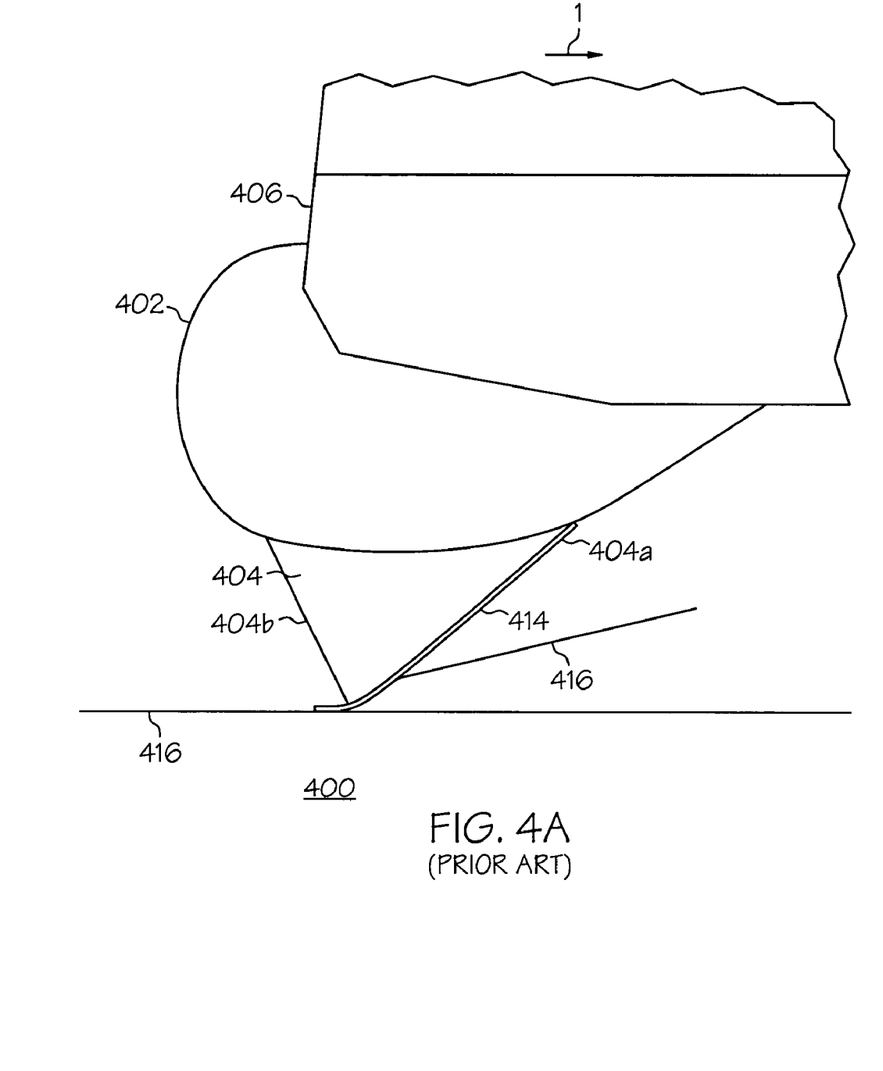
Figure 4B:
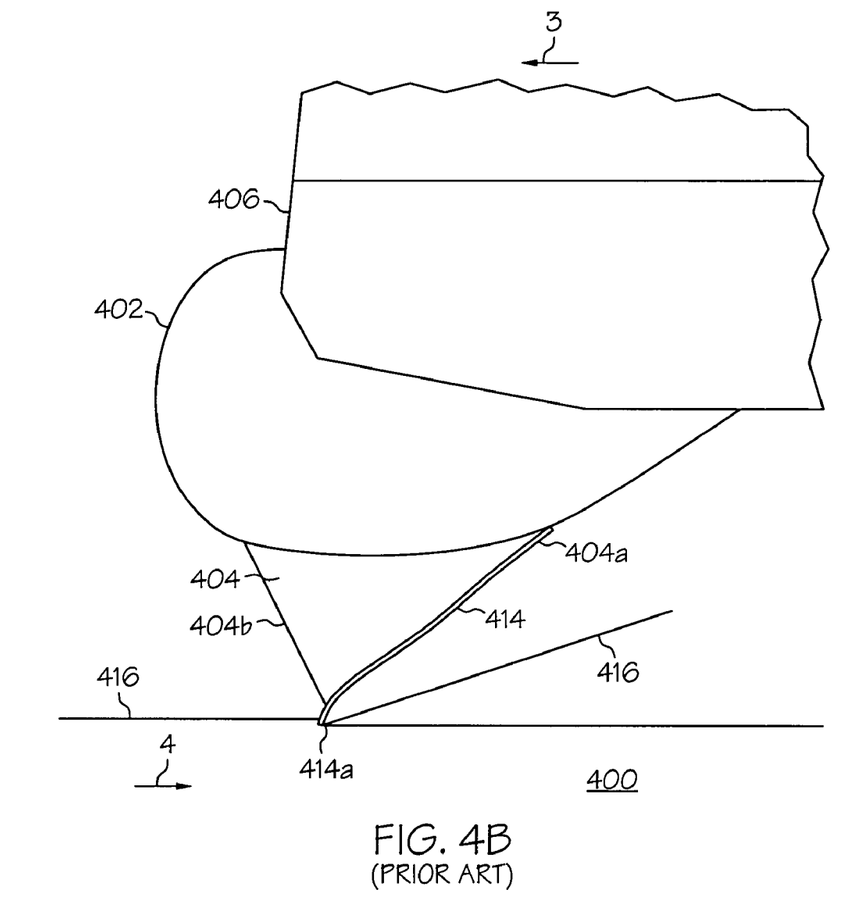

FIG. 4 shows two profiles, FIG. 4A and FIG. 4B, that show a prior art ACV skirt system 400 with a finger and planing element or stiffener 414. Planing elements or stiffeners, such as 414, have been used to prevent scooping and related problems, described above, for closed stem fingers or stem finger cones in certain applications. Planing element 414 is attached to a leading edge 404a of the closed finger 404. FIG. 4A shows the direction of ACV movement 1 relative to the underlying water or terrain 416 for forward motion of the ACV. FIG. 4B shows the ACV moving in a reversed direction relative to FIG. 4A, with the ACV movement 3 and underlying terrain, e.g., water, movement 4 indicated.

Stiffeners such as 414 may reduce the occurrence of scooping, however they may introduce other disadvantages for the associated skirt systems. Stiffeners are typically made from multiple bonded layers of skirt fabric or hard plastic. As a result of such construction, cones or fingers with stiffeners may be two to three (or more) times heavier than conventional open-finger designs. Additionally, fingers with stiffeners such as 414 may be more expensive than open-finger designs.

With particular reference to FIG. 4B, another notable problem associated with the use of stiffeners 414 may be seen. When an ACV having stem fingers 404 with leading edge stiffeners 414a backs up or moves to the stem, the stiffener tip 414a can snag on the underlying terrain or water surface 416 as shown. Such snagging of the stiffener tip 414a may increase the moving resistance of the ACV and possibly result in damage to the finger 404 and adjacent structure of the skirt system 400. For example, flagellating remnants of a damaged or blown-out finger with stiffeners may cause damage to adjacent fingers or other portions of the associated skirt system.

Figure 5:
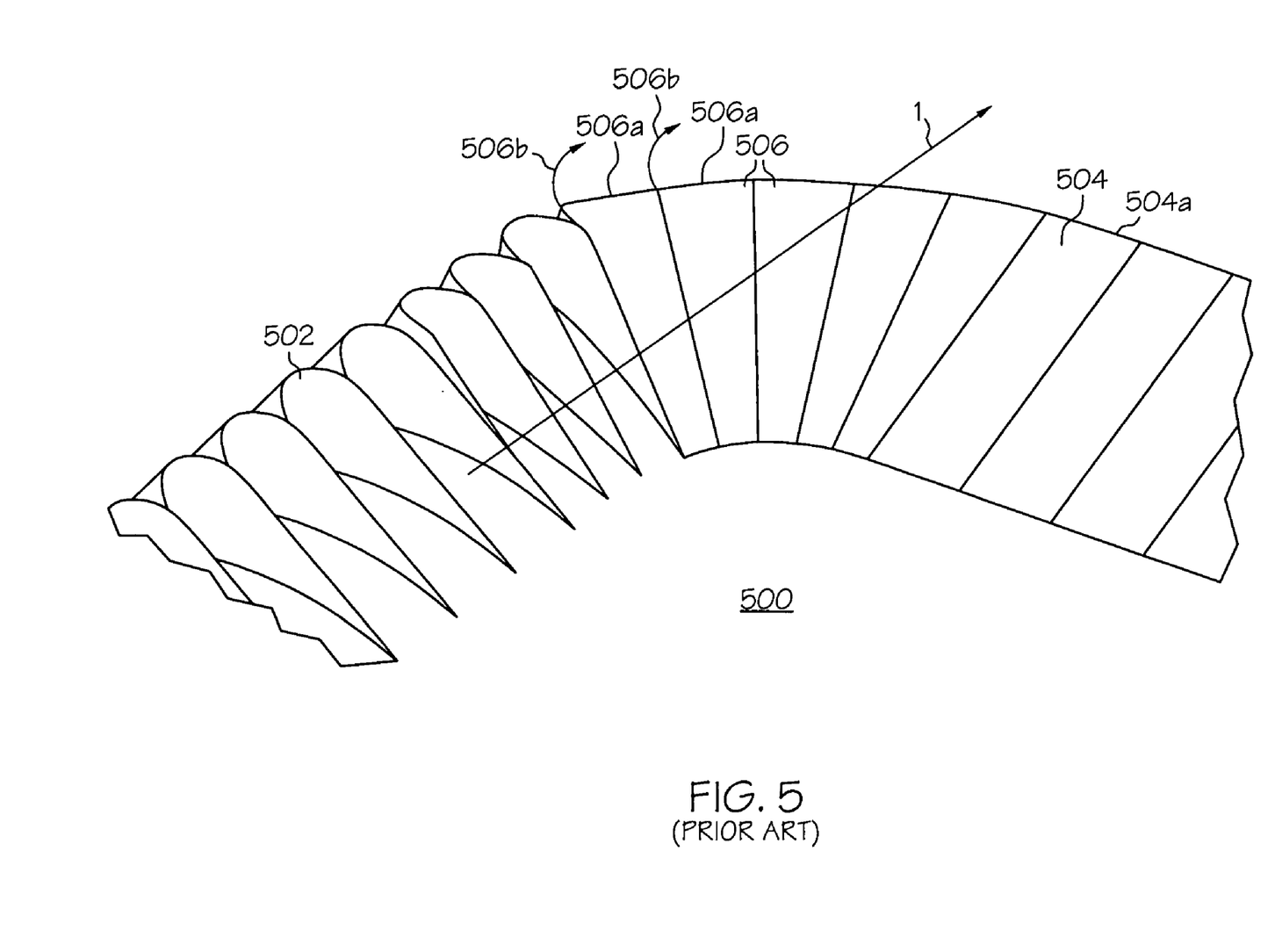
FIG. 5 shows the underside of a stem corner of prior art ACV skirt system having fingers with stiffening elements.

FIG. 5 shows the underside of a stem corner of prior art ACV skirt system 500 having fingers with stiffening elements. The direction of water surface flow 1 is shown and represents the direction of water flow for normal forward motion of the related ACV. The skirt system 500 has a skirt bag (omitted for clarity) with attached fingers including stem fingers 504 and stem corner fingers 506. The fingers 504, 506 include stiffening elements 504a, 506a located at the leading edges.

When stiffeners 506a are used with stem corner fingers 506, the stiffening elements 506a may twist and under go a displacement 506b, e.g., either up or down, due to the water surface flow 1 relative to the ACV. The twisting of the stiffeners 506a produces drag on the ACV and stress on adjacent fingers, e.g. stem corner fingers 506. Damage may occur to one or more of the adjacent fingers 506 as a result of such twisting and displacement 506b.

Attempts have been made to reinforce stem corner fingers to withstand twisting stresses produced by the forces on stiffener elements. However, these efforts have had only marginal success at increasing finger life and have significantly increased the cost and weight of the fingers.

What are needed therefore are lightweight, inexpensive stem fingers for an air-cushion vehicle (ACV) that are resistant to scooping and snagging. What are further needed are related methods of manufacturing such stem fingers for use with ACV skirt systems.

SUMMARY

Embodiments of the present invention are directed to wrapped-cone fingers that are lightweight, inexpensive and resistant to scooping and snagging. Wrapped-cone fingers may include an inner cone that is "wrapped" or generally enclosed by an outer finger. Embodiments of the present invention are also directed to skirt systems and methods of manufacture wrapped-cone fingers for use with ACV skirt systems.

A first embodiment may include a wrapped-cone finger for an air-cushion vehicle (ACV) system. The wrapped-cone finger may include an outer finger having an outer finger surface having an outer finger opening. The outer finger may have an outer finger longitudinal axis. The wrapped-cone finger may include an inner cone placed in the outer finger. The inner cone may have an inner cone longitudinal axis. The wrapped-cone finger is operable to move from an inflated state where the outer finger opening is substantially blocked by the inner cone to a deflated state where the outer finger opening is not substantially blocked by the inner cone.

The inner cone may include an inner cone opening. The outer finger may include an outer finger attachment perimeter for connection to a skirt bag surface. The inner cone may include an inner cone attachment perimeter for connection to a skirt bag surface. The outer finger may be attached to a skirt bag surface. The outer finger may include a flexible material. The outer finger flexible material may be made of a suitable material such as nylon and may include an elastomer, such as for non-limiting example, natural rubber or rubber-coated fabric.

A second embodiment may include an air-cushion vehicle (ACV) skirt system that includes a skirt bag and a plurality of fingers attached to and depending from the skirt bag. The plurality of fingers includes one or more wrapped-cone fingers having an inner cone placed within an outer finger. Each of said one or more wrapped-cone fingers may include an outer finger having an outer finger surface having an outer finger opening. The outer finger may have an outer finger longitudinal axis. Each of the one or more wrapped-cone fingers may include an inner cone placed in the outer finger.

Each wrapped-cone finger is operable to move from an inflated state where the outer finger opening is substantially blocked by the inner cone to a deflated state where the outer finger opening is not substantially blocked by the inner cone.

The inner cone of a wrapped-cone finger may include an inner cone opening. The outer finger may include an outer finger attachment perimeter for connection to a surface of a skirt bag. The inner cone may include an inner cone attachment perimeter for connection to a surface of a skirt bag. The outer finger may include a surface of the skirt bag. The outer finger may include a flexible material. The one or more wrapped-cone fingers may be located at a stem portion of the skirt bag. The one or more wrapped-cone fingers may be located at a stem corner portion of the skirt bag.

A third embodiment may include a method of manufacturing a wrapped-cone finger. An outer finger may be formed of flexible material. An inner cone may be formed of flexible material. The inner cone may be placed in the outer finger, thereby forming a wrapped-cone finger. The outer finger may be attached to a skirt bag. The step of attaching the outer finger to a skirt bag may include a step of releasably attaching the outer finger to the skirt bag. The step of attaching the outer finger to a skirt bag may include bolting or riveting the outer finger to the skirt bag. The inner cone may be attached to a skirt bag.

DESCRIPTION OF THE DRAWINGS

These and other features, aspects, and advantages of the present invention will become better understood with regard to the following description, appended claims, and accompanying drawings. The drawings are not necessarily to scale, emphasis instead being placed on illustration of principles of the invention. The drawings include the following figures:

FIG. 4 shows two profiles, FIG. 4A and FIG. 4B, that show a prior art ACV skirt system with a finger and planing element or stiffener.

DETAILED DESCRIPTION

The present invention may be understood by the following detailed description, which should be read in conjunction with the attached drawings. The following detailed description of certain embodiments is by way of example only and is not meant to limit the scope of the present invention.

Embodiments of the present invention are directed to wrapped-cone fingers for use in an air-cushion vehicle (ACV) skirt system. Wrapped-cone fingers according to the present invention may be lightweight, inexpensive and resistant to scooping and snagging. Wrapped-cone fingers may include an inner cone that is "wrapped" or generally enclosed by an outer finger. Embodiments of the present invention are also directed to skirt systems and methods of manufacturing wrapped-cone fingers.

Figure 6:
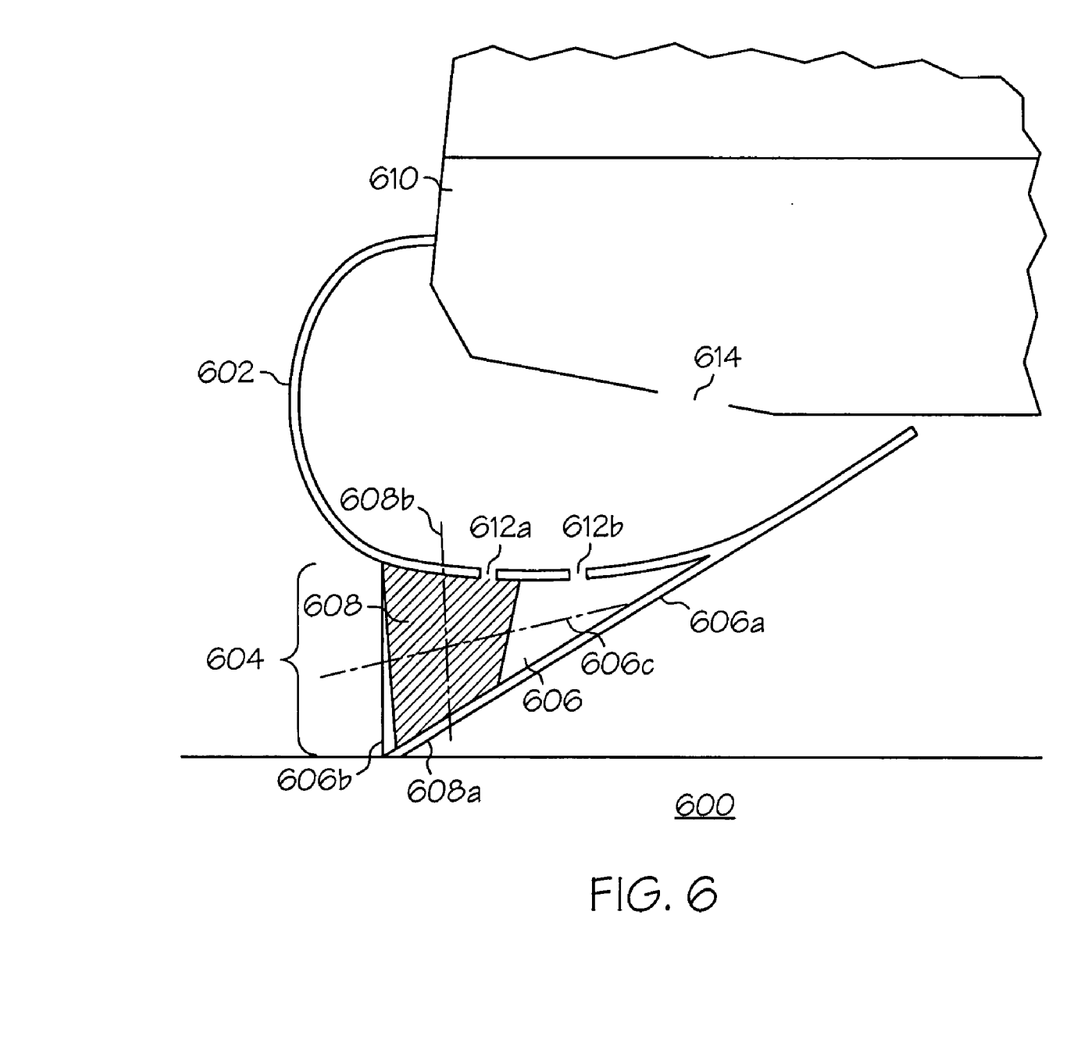
FIG. 6 shows a profile of one embodiment of the present invention including a wrapped-cone air cell or finger.

FIG. 6 shows a profile of one embodiment 600 of the present invention including a wrapped-cone air cell or finger 604. The wrapped-cone finger 604 may include an outer finger 606 of flexible material that "wraps" or generally encloses an inner cone 608 of flexible material. The outer finger 606 may be attached to a skirt bag 602 as part of an air-cushion vehicle (ACV) skirt system. In certain embodiments, the outer finger may be attached to an intermediate attachment structure or finger flap (not shown) that is attached to the skirt bag 602. The outer finger 606 may include a leading face or edge 606a and an opening or open back face 606b. The inner cone may have a lower opening 608a. The wrapped-cone finger 604 may be located at the stem or stem corners of a skirt bag in certain embodiments. The skirt bag 602 may be inflated by suitable means. For example, the skirt bag may be inflated with air from one or more air ducts 614 receiving air from fans located on a deck 610 of the ACV.

Figure 8:
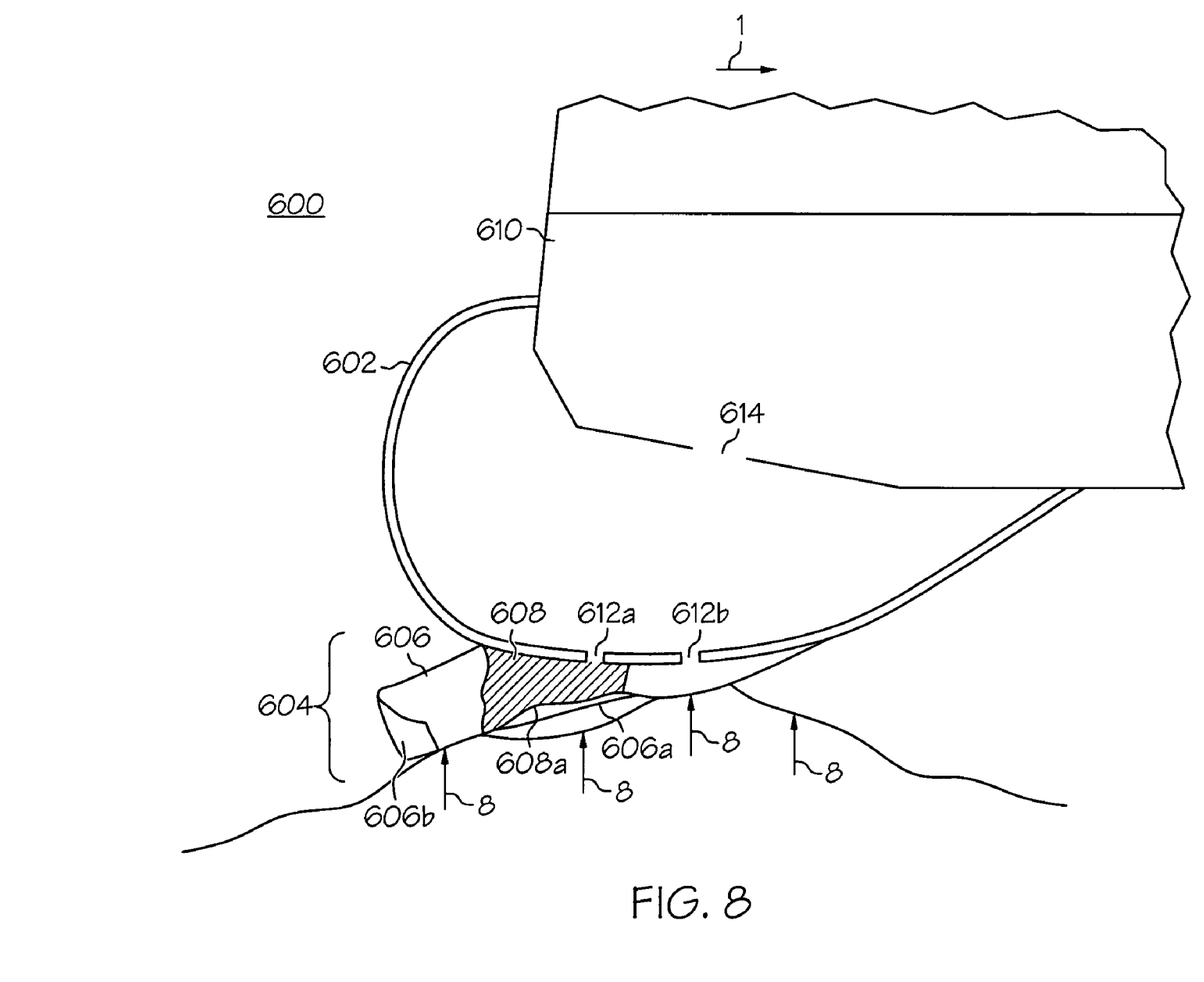
FIG. 8 shows a profile of the wrapped-cone finger of FIG. 6 with bow direction indicated.

The outer finger 606 may have an outer finger longitudinal axis 606c substantially along the midline of the volume or interior defined by the outer finger 606 surface. The inner cone 608 may have an inner cone longitudinal axis 608b. When the wrapped-cone finger 604 is in an inflated state, the inner cone longitudinal axis 608b may be in a first position relative to the outer finger longitudinal axis 606c. In certain embodiments, the first position of the inner cone longitudinal axis may be substantially perpendicular or not parallel to the outer finger longitudinal axis 606c, for example as shown in FIG. 6. When the wrapped-cone finger 604 is in a deflated state, for example as shown in FIG. 8, the inner cone longitudinal axis 608b may be in a second position with respect to the outer finger longitudinal axis 606c. In certain embodiments, the second position of the inner cone longitudinal axis 608b may be more acute or more closely parallel to the outer finger longitudinal axis 606c when compared to the first position. It should be understood that the respective cones and fingers, including the respective longitudinal axes, may bend or deform as the respective cones and fingers move and/or deform in shape during usage.

Any suitable materials may be used for the skirt bag 602 and wrapped-cone finger 604. For example, the skirt bag 602 and wrapped-cone finger 604 may be made from materials including but not limited to elastomer-coated fabrics. In certain embodiments, a Type I Rubber Coated Fabric, Part No. 50000010, made by Bell Avon, Inc. of 1200 Martin Luther King Jr. Blvd, Picayune, Miss. 39466 may be used. Suitable coatings may include but are not limited to polybutadiene or natural rubber. In certain other embodiments, neoprene or natural rubber coated nylon may be used for a wrapped-cone finger 604. The thickness of any coating and amount of plies and density of the base, e.g., nylon fabric, may be adapted to a particular application. For example, the thickness of the base and the number of base plies may be selected based on design parameters such as finger size, ACV speed, cushion pressure, and weight of the ACV.

With continued reference to FIG. 6, the inner cone 608 may receive air through an inner cone feed hole 612a located in the wall of the skirt bag 602. During the inflation, the inner cone lower opening 608a may be sealed or substantially sealed by the leading face 606a of the outer finger 606.

As the inner cone 608 becomes inflated, it obstructs or blocks the passage of air out of the open back face 606b of the outer finger, creating a pressure differential between the interior of the outer finger 606 and the ambient environment. In certain embodiments, the outer finger 606 may receive air through one or more outer finger feed holes 612b. A feed duct 614 is shown in the hull 610 for the inflation of the skirt bag 602.

Figure 7:
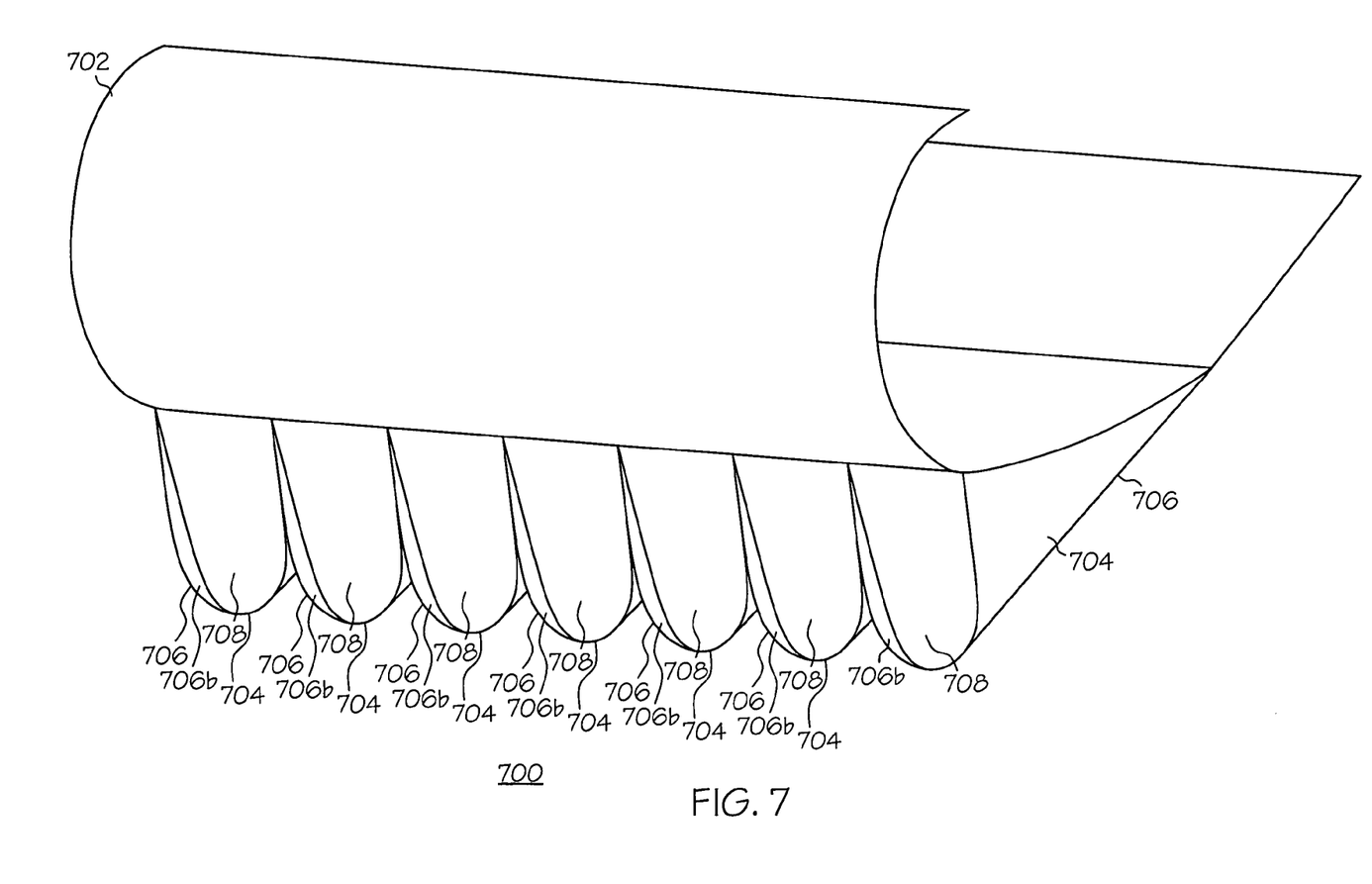
FIG. 7 is a perspective view of a stem portion of a skirt system with wrapped-cone fingers according to one embodiment

FIG. 7 is a perspective view of a stem portion of a skirt system 700 with wrapped-cone fingers according to one embodiment. The skirt system 700 may include a skirt bag 702 and one or more wrapped-cone fingers 704. The wrapped-cone fingers 704 may each include an outer finger 706 and an inner cone 708. An outer finger 706 may include a leading edge or face 706a and an open back face 706b. Each inner cone 708 may be located within the interior of an outer finger 706. When inflated as shown, each inner cone 708 may block the open back face 706b of the associated outer finger 706.

Referring to FIG. 8, use of an embodiment of the present invention will now be described. FIG. 8 shows a profile of the wrapped-cone finger 604 of FIG. 6 with bow direction 1 indicated. The wrapped-cone finger 604 is shown in a collapsed state due to the impact of a wave 8. During the operation of an associated ACV over a water surface, the force of the impacting wave 8 may cause wrapped-cone finger to deflate, e.g., by causing air to exit through the inner cone opening 608a and the open back face 606b.

When a wave 8 hits or impacts the leading edge 606a of the wrapped-cone finger 604, the outer finger or cone 606 sweeps back and the inner cone 608 collapses. After the wave 8 passes, the inner cone 608 reinflates with air forced through the one or more inner cone feed holes 612a, thereby closing the back of the outer finger 606b and allowing the outer the wrapped-cone finger 604 to reinflate. The inflation of the wrapped-cone finger 604 with air from the skirt bag 602 and feed duct 614 may be further facilitated by an optional outer finger feed hole 612b. The outer finger feed hole 612b may open into the outer finger 606 at a location interior to the inner cone 608.

Because the wrapped-cone finger 604 does not have an attached back-face, forces on the leading edge 606a due to impacting waves tend to collapse the outer finger 606 and angle or sweep the inner cone 608 backward within the wrapped-cone finger 604. As the inner cone 608 sweeps backward, air is pushed out of the wrapped-cone finger 604 through the inner cone lower opening 608a and the open back face 606b of the outer finger 606. When the wrapped-cone finger 604 is deflated by an impacting wave in this manner, scooping may be minimized or avoided altogether. The lack of any stiffeners minimizes or prevents snagging and allows the wrapped-cone finger 604 to be light-weight.

Figure 9:
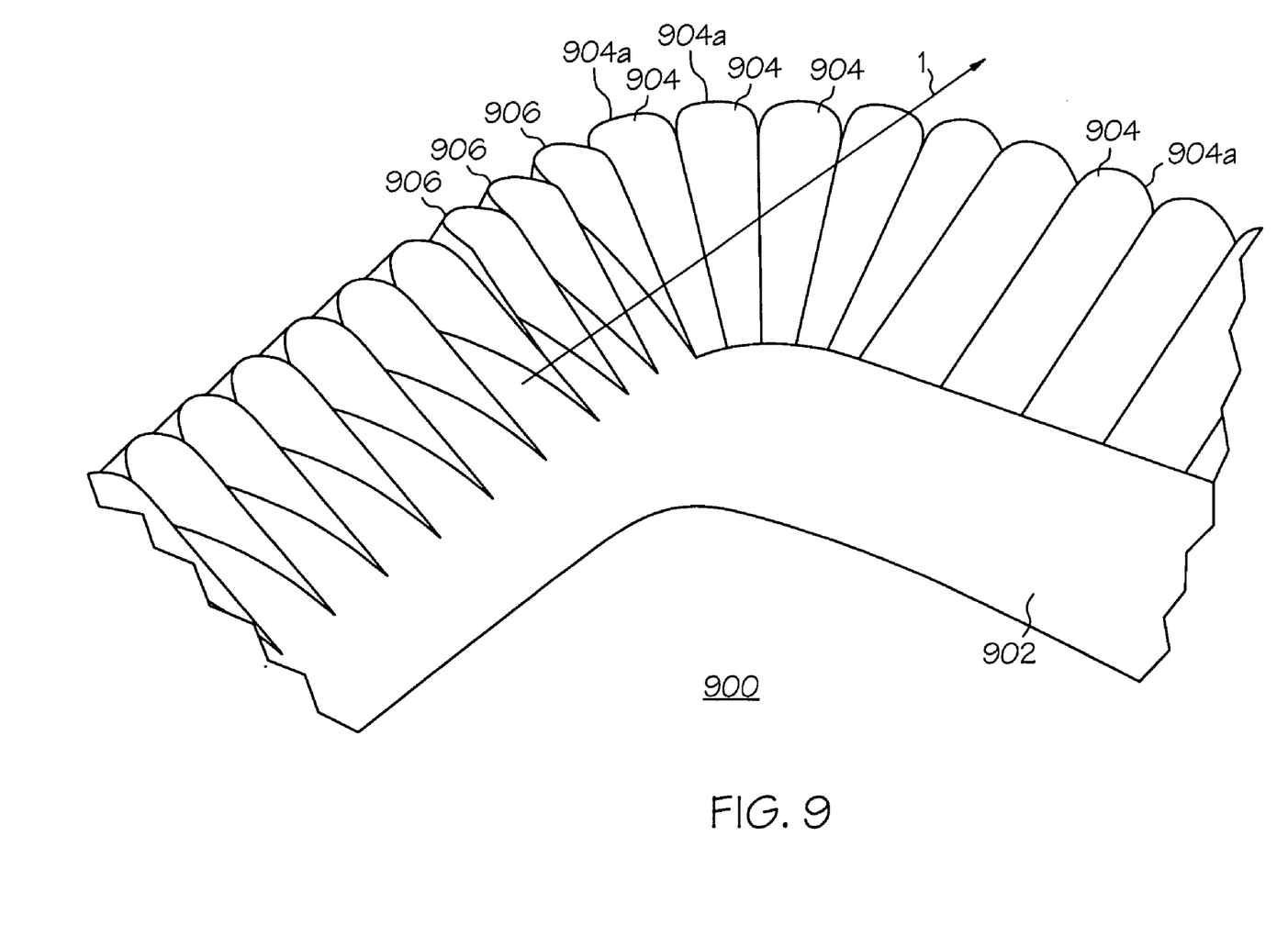
FIG. 9 shows the underside of a skirt system according to one embodiment.

FIG. 9 shows the underside of a skirt system 900 according to one embodiment. The skirt system 900 may include wrapped-cone fingers 904 at the stem and stem corner areas of an associated skirt bag 902 and open fingers 906 at the skirt port and starboard sides. Water surface flow direction 1 is indicated for movement of the related ACV and skirt system 900 toward or in front of the ACV bow.

The wrapped-cone fingers 904 may be installed or located in stem corner areas of an associated skirt bag without the inherent problems of stiffener elements, e.g., 506a of FIG. 5, misaligned to the ACV direction. Compared to fingers having stiffener elements, e.g., fingers 506 with stiffeners 506a shown in FIG. 5, an outer edge 904a of a wrapped-cone finger 904 may have a more rounded interface with the water surface flow 1. Consequently, the wrapped-cone fingers 904 are resistant to twisting and displacement when water flows across the finger 904. Problems described above regarding prior art skirt systems and fingers, e.g., twisting and drag, may be consequently be minimized or eliminated.

Figure 10:
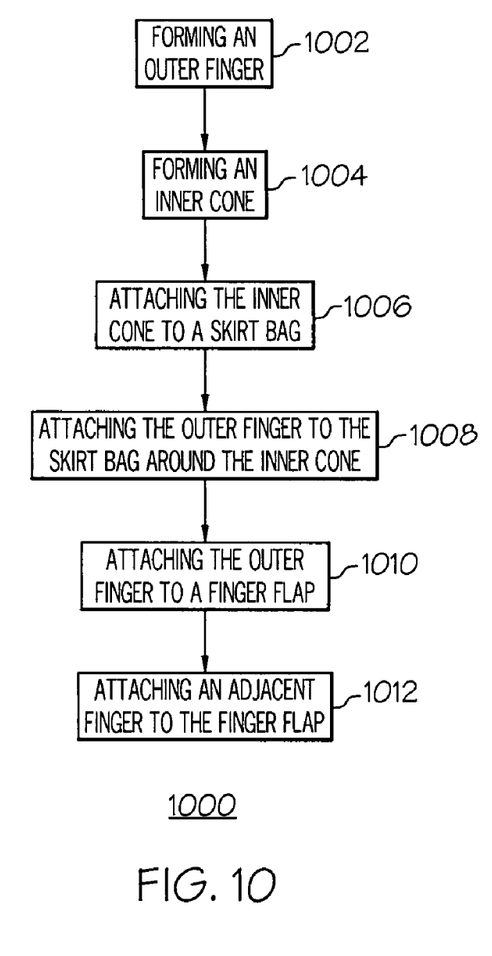
FIG. 10 shows steps in a method of manufacturing a wrapped-cone finger for use in a skirt system.

FIG. 10 shows steps in a method 1000 of manufacturing a wrapped-cone finger for use in a skirt system. An outer finger of flexible fabric may be formed 1002. An inner cone of flexible fabric may be formed 1004. The inner cone may have an inner cone lower opening. The outer finger may have an open back face. The inner cone may be attached 1006 to a skirt bag for use on an air cushioned vehicle (ACV). The outer finger may be attached 1008 to the skirt bag around the inner cone, thereby forming a wrapped cone finger. The outer finger may optionally be attached 1010 to a finger flap acting as an intermediate attachment structure between the skirt bag and the outer finger. An adjacent finger for use in a skirt system of an ACV may be attached 1012 to the finger flap. The adjacent finger may include a wrapped-cone finger.

Accordingly, embodiments of the present invention may provide wrapped-cone fingers and skirt systems that have advantages over the prior art. In certain embodiments, wrapped-cones fingers may be lower in cost and lighter in weight than typical fingers. Wrapped-cone fingers may be located at desired portions or locations of a skirt bag for an air cushioned vehicle (ACV) including, for non-limiting example, the stem and stem corner portions of a skirt bag. Embodiments may eliminate the need for stiffeners or planing elements for certain types of fingers, e.g., stem fingers and stem corner fingers. Wrapped-cone fingers may also be installed in corners portions or areas of a skirt bag without the inherent problems of stiffener elements being misaligned to the craft direction. In certain embodiments, stem fingers may be created that have low-drag, stable shapes that minimize or prevent the scooping of water.

Wrapped-cone fingers of certain embodiments may be suitable for implementation or retrofit on existing air-cushion vehicles (ACVs) and associated skirt systems. For example, wrapped-cone fingers according to the present invention may be suitable for implementation on ACVs including, but not limited to, the Landing Craft, Air Cushion (LCAC) used by the U.S. Navy.

Failure modes for certain embodiments may be a gradual wearing out of the outer finger or cone material, and then wearing out the bottom of the inner cone due to abrasion and flagellation. In the case that failure of an individual wrapped-cone finger occurs, undue damage to adjacent fingers or skirt bag areas may be minimized or prevented. Embodiments may also provide improved longevity for skirt systems and ease of repair may be increased by localized spot repair, e.g., the application of patches, to portions of the wrapped-cone outer and inner assemblies.

Although the present invention has been described in considerable detail with reference to certain preferred version thereof, other versions are possible. For example, while he previous description has described use of wrapped-cone fingers at stem and stem corner locations of ACV skirt systems, wrapped-cone fingers may be used at other locations of skirt systems in certain embodiments.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise.

What is claimed is:

1. A wrapped-cone finger for an air-cushion vehicle skirt system, comprising:
   an outer finger having a leading edge and an outer finger surface having an outer finger opening;
   an inner cone disposed within said outer finger and having a leading edge that forms an acute angle with the leading edge of the outer finger; and
   wherein said wrapped-cone finger is operable to move from an inflated state where said outer finger opening is substantially blocked by said inner cone to a deflated state where said outer finger opening is not substantially blocked by said inner cone.

2. The wrapped-cone finger of claim 1, further comprising an inner cone opening that enables the inner cone to be inflated via the opening.

3. The wrapped-cone finger of claim 1, further comprising a skirt bag having a skirt bag surface and wherein said first outer finger surface further comprises an outer finger attachment perimeter for connection to the skirt bag surface.

4. A wrapped-cone finger for an air-cushion vehicle skirt system, comprising:
   an outer finger having an outer finger surface having an outer finger opening;
   an inner cone disposed within said outer finger;
   wherein said wrapped-cone finger is operable to move from an inflated state where said outer finger opening is substantially blocked by said inner cone to a deflated state where said outer finger opening is not substantially blocked by said inner cone; and
   a skirt bag having a skirt bag surface and wherein said inner cone further comprises an inner cone attachment perimeter for connection to the skirt bag surface.

5. The wrapped-cone finger of claim 3, further comprising a skirt bag having a skirt bag surface and wherein said skirt bag surface is attached to said attachment perimeter.

6. The wrapped-cone finger of claim 1, wherein the outer finger is of a flexible material.

7. The wrapped-cone finger of claim 6, wherein the flexible material is an elastomer.

8. The wrapped-cone finger of claim 6, wherein the flexible material is a natural rubber.

9. The wrapped-cone finger of claim 6, wherein the flexible material is a a rubber-coated fabric.

10. The wrapped-cone finger of claim 9, wherein the rubber-coated fabric is coated with polybutadiene.

11. The wrapped-cone-finger of claim 6, wherein the flexible material includes a nylon base fabric.

12. The wrapped-cone finger of claim 11, wherein the nylon base fabric includes one or more plies of nylon fabric.

13. A wrapped-cone finger for an air-cushion vehicle skirt system, comprising:
   an outer finger having an outer finger surface having an outer finger opening;
   an inner cone disposed within said outer finger;
   wherein said wrapped-cone finger is operable to move from an inflated state where said outer finger opening is substantially blocked by said inner cone to a deflated state where said outer finger opening is not substantially blocked by said inner cone;
   wherein said outer finger includes an outer finger longitudinal axis and said inner cone includes an inner cone longitudinal axis, wherein in said inflated state said inner cone longitudinal axis is in a first position with respect to said outer finger longitudinal axis, and wherein in said deflated state said inner cone longitudinal axis is in a second position with respect to said outer finger longitudinal axis.

14. The wrapped-cone finger of claim 13, wherein said first position of said inner cone longitudinal axis is substantially perpendicular to said outer finger longitudinal axis.

15. The wrapped-cone finger of claim 13, wherein said second position of said inner cone longitudinal axis is substantially parallel to said outer finger longitudinal axis.

16. An air cushion vehicle (ACV) skirt system comprising:
   a) a hull;
   b) a skirt bag attached to the hull;
   c) a plurality of fingers attached to and depending from said skirt bag, wherein said plurality of fingers includes one or more wrapped-cone fingers having an inner inflatable cone placed within an outer inflatable finger having a leading edge, said inner cone having a leading edge that forms an acute angle with the leading edge of the outer finger;
   d) wherein the outer inflatable finger has a generally U shaped cross section having a larger upper end portion and a smaller lower end portion; and
   e) the inner inflatable cone contained within the outer inflatable finger.

17. An air cushion vehicle (ACV) skirt system comprising:
   a) a hull;
   b) a skirt bag attached to the hull;
   c) a plurality of fingers attached to and depending from said skirt bag, wherein said plurality of fingers includes one or more wrapped-cone fingers having an inner inflatable cone placed within an outer inflatable finger;
   d) wherein the outer inflatable finger has a generally U shaped cross section having a larger upper end portion and a smaller lower end portion;
   e) the inner inflatable cone contained within the outer inflatable finger;
   f) wherein each of said one or more wrapped-cone fingers comprises:
      an outer finger having an outer finger surface defining an outer finger opening and an outer finger interior having an outer finger longitudinal axis; and
      an inner cone disposed with said outer finger interior, said inner cone having an inner cone longitudinal axis that is not parallel to said outer finger longitudinal axis when said inner cone is in an inflated state.

18. An air cushion vehicle (ACV) skirt system comprising:
   a) a hull;
   b) a skirt bag attached to the hull;
   c) a plurality of fingers attached to and depending from said skirt bag, wherein said plurality of fingers includes one or more wrapped-cone fingers having an inner cone placed within an outer finger;
   d) wherein each of said one or more wrapped-cone fingers comprises:
      an outer finger having an outer finger surface defining an outer finger opening and an outer finger interior having an outer finger longitudinal axis; and
      an inner cone disposed within said outer finger interior, said inner cone having an inner cone longitudinal axis that is not parallel to said outer finger longitudinal axis when said inner cone is in an inflated state;
   e) wherein said inner cone further comprises an inner cone opening.

19. The system of claim 17, wherein said outer finger further comprises an outer finger attachment perimeter for connection to a surface of said skirt bag.

20. The system of claim 17, wherein said inner cone further comprises an inner cone attachment perimeter for connection to a surface of said skirt bag.

21. The system of claim 19, wherein said outer finger attachment perimeter comprises a finger flap.

22. The system of claim 17, wherein said first outer finger comprises a flexible material.

23. The system of claim 17, wherein said one or more wrapped-cone fingers are located at a stern portion of said skirt bag.

24. The system of claim 17, wherein said one or more wrapped-cone fingers are located at a stern corner portion of said skirt bag.

25. An air cushion comprising:
   a) a hull;
   b) an inflatable skirt bag attached to the hull;
   c) a plurality of fingers attached to and depending from the skirt bag, the fingers including at least one inflatable wrapped-cone finger; d) the wrapped cone finger comprising:
      an inner inflatable cone placed inside of an outer inflatable finger such that the inner cone is disposed within the outer finger;
      the outer finger having an outer finger surface providing a leading edge and having an outer finger opening; and
      the inner cone having a leading edge that forms an acute angle with the leading edge of the outer finger; and,
   e) wherein the wrapped-cone finger is operable to move from an inflated state where the outer finger opening is substantially blocked by the inner cone to a deflated state where the outer finger opening is not substantially blocked by the inner cone.

26. The air cushion of claim 25, wherein the outer finger includes an outer finger longitudinal axis and the inner cone includes an inner cone longitudinal axis, wherein in the inflated state the inner cone longitudinal axis is in a first position with respect to the outer finger longitudinal axis, and wherein in the deflated state the inner cone longitudinal axis is in a second position with respect to the outer finger longitudinal axis.

27. The air cushion of claim 26, wherein the first position of the inner cone longitudinal axis is substantially perpendicular to the outer finger longitudinal axis.

28. The air cushion of claim 26, wherein the second position of the inner cone longitudinal axis is substantially parallel to the outer finger longitudinal axis.

29. The air cushion of claim 25, wherein the outer inflatable finger has a generally U shaped cross section having a larger upper end portion and a smaller lower end portion; and wherein the inner inflatable cone is contained within the outer inflatable finger.

30. The air cushion of claim 29, wherein each of said one or more wrapped-cone fingers comprises:
   an outer finger interior having an outer finger longitudinal axis and the outer finger surface defining the outer finger opening, and;
   the inner cone disposed within the outer finger interior, the inner cone having an inner cone longitudinal axis that is not parallel to the outer finger longitudinal axis when the inner cone is in an inflated state.

31. The air cushion of claim 30, wherein the inner cone further comprises an inner cone opening.

32. A wrapped-cone finger for an air-cushion vehicle skirt system, comprising:

a) an air bag affixed to the vehicle;
b) an outer finger having a leading edge and an outer finger surface having an outer finger opening;
c) an inner cone disposed within said outer finger and behind the outer finger leading edge;
d) wherein said wrapped-cone finger is operable to move from an inflated state where said outer finger opening is substantially blocked by said inner cone to a deflated state where said outer finger opening is not substantially blocked by said inner cone; and
e) flow channels that supply air from the air bag to the inner cone and outer finger, one of the openings inflating the inner cone, the other opening being in between the inner cone and the leading edge of the outer finger.

33. The wrapped-cone finger of claim 32, wherein the outer finger is of a flexible material.

34. The wrapped-cone finger of claim 33, wherein the flexible material is an elastomer.

35. The wrapped-cone finger of claim 33, wherein the flexible material is a natural rubber.

36. The wrapped-cone finger of claim 33, wherein the flexible material is a rubber-coated fabric.

37. The wrapped-cone finger of claim 33, wherein the rubber-coated fabric is coated with polybutadiene.

38. The wrapped-cone-finger of claim 33, wherein the flexible material includes a nylon base fabric.

39. The wrapped-cone finger of claim 38, wherein the nylon base fabric includes one or more plies of nylon fabric.

40. The system of claim 32, wherein said outer finger further comprises an outer finger attachment perimeter for connection to a surface of said skirt bag.

41. The system of claim 32, wherein said inner cone further comprises an inner cone attachment perimeter for connection to a surface of said skirt bag.

42. The system of claim 40, wherein said outer finger attachment perimeter comprises a finger flap.

43. The system of claim 32, wherein said first outer finger comprises a flexible material.

44. The system of claim 32, wherein said one or more wrapped-cone fingers are located at a stern portion of said skirt bag.

45. The system of claim 32, wherein said one or more wrapped-cone fingers are located at a stern corner portion of said skirt bag.

46. The air cushion of claim 32, wherein the outer finger includes an outer finger longitudinal axis and the inner cone includes an inner cone longitudinal axis, wherein in the inflated state the inner cone longitudinal axis is in a first position with respect to the outer finger longitudinal axis, and wherein in the deflated state the inner cone longitudinal axis is in a second position with respect to the outer finger longitudinal axis.

47. The air cushion of claim 46, wherein the first position of the inner cone longitudinal axis is substantially perpendicular to the outer finger longitudinal axis.

48. The air cushion of claim 46, wherein the second position of the inner cone longitudinal axis is substantially parallel to the outer finger longitudinal axis.

49. The air cushion of claim 32, wherein the outer inflatable finger has a generally U shaped cross section having a larger upper end portion and a smaller lower end portion; and wherein the inner inflatable cone is contained within the outer inflatable finger.

50. The air cushion of claim 49, wherein each of said one or more wrapped-cone fingers comprises:
   an outer finger interior having an outer finger longitudinal axis and the outer finger surface defining the outer finger opening; and
   the inner cone disposed within the outer finger interior, the inner cone having an inner cone longitudinal axis that is not parallel to the outer finger longitudinal axis when the inner cone is in an inflated state.

* * * * *